(12) United States Patent
Okazaki et al.

(10) Patent No.: US 6,437,343 B1
(45) Date of Patent: Aug. 20, 2002

(54) SCANNER SYSTEM AND PIEZOELECTRIC MICRO-INCHING MECHANSIM USED IN SCANNING PROBE MICROSCOPE

(75) Inventors: Kenya Okazaki; Hirohisa Fujimoto, both of Hachioji; Shuichi Ito, Sagamihara, all of (JP)

(73) Assignee: Olympus Optical Co., Ltd., Tokyo (JP)

(*) Notice: Subject to any disclaimer, the term of this patent is extended or adjusted under 35 U.S.C. 154(b) by 0 days.

(21) Appl. No.: 09/265,184

(22) Filed: Mar. 9, 1999

(30) Foreign Application Priority Data

| | | | |
|---|---|---|---|
| Mar. 13, 1998 | (JP) | | 10-062708 |
| Mar. 20, 1998 | (JP) | | 10-072561 |
| Mar. 23, 1998 | (JP) | | 10-073923 |

(51) Int. Cl.[7] .............................................. H01J 37/26
(52) U.S. Cl. .................................. 250/442.11; 250/306
(58) Field of Search ........................... 250/442.11, 306, 250/307; 73/105; 310/311, 313 A

(56) References Cited

U.S. PATENT DOCUMENTS

| | | | | |
|---|---|---|---|---|
| 5,289,004 A | * | 2/1994 | Okada et al. ................ | 250/306 |
| 5,508,517 A | * | 4/1996 | Onuki et al. ................ | 250/306 |
| 5,526,165 A | | 6/1996 | Toda et al. | |
| 5,729,015 A | * | 3/1998 | Tong .......................... | 250/306 |
| 5,952,562 A | * | 9/1999 | Yagi et al. .................. | 250/306 |
| 6,127,681 A | * | 10/2000 | Sato et al. .................. | 250/306 |
| 6,127,682 A | * | 10/2000 | Nakamoto .................. | 250/306 |
| RE37,299 E | * | 7/2001 | Amer et al. ................ | 250/306 |

FOREIGN PATENT DOCUMENTS

| | | | |
|---|---|---|---|
| EP | 0 296 119 A | * | 6/1988 |
| JP | 53-12564 | | 11/1993 |
| JP | 6-229753 | | 8/1994 |
| JP | 8-285865 | | 11/1996 |

* cited by examiner

Primary Examiner—Kiet T. Nguyen
(74) Attorney, Agent, or Firm—Frishauf, Holtz, Goodman & Chick, P.C.

(57) ABSTRACT

A tube scanner comprises a piezoelectric ceramic in the form of a hollow cylinder, which is externally surrounded by a Z-axis outside electrode and four slip-shaped driving electrodes arranged at intervals in the circumferential direction. The piezoelectric ceramic is internally surrounded by a Z-axis inside electrode and an XY-axis common electrode. The Z-axis inside electrode faces the Z-axis outside electrode across the piezoelectric ceramic, while the XY-axis common electrode faces the X- and Y-axis driving electrodes across the ceramic. Opposite-polarity voltages are applied to the Z-axis outside electrode and the Z-axis inside electrode, individually, whereupon the tube scanner is displaced in the Z-axis direction.

18 Claims, 10 Drawing Sheets

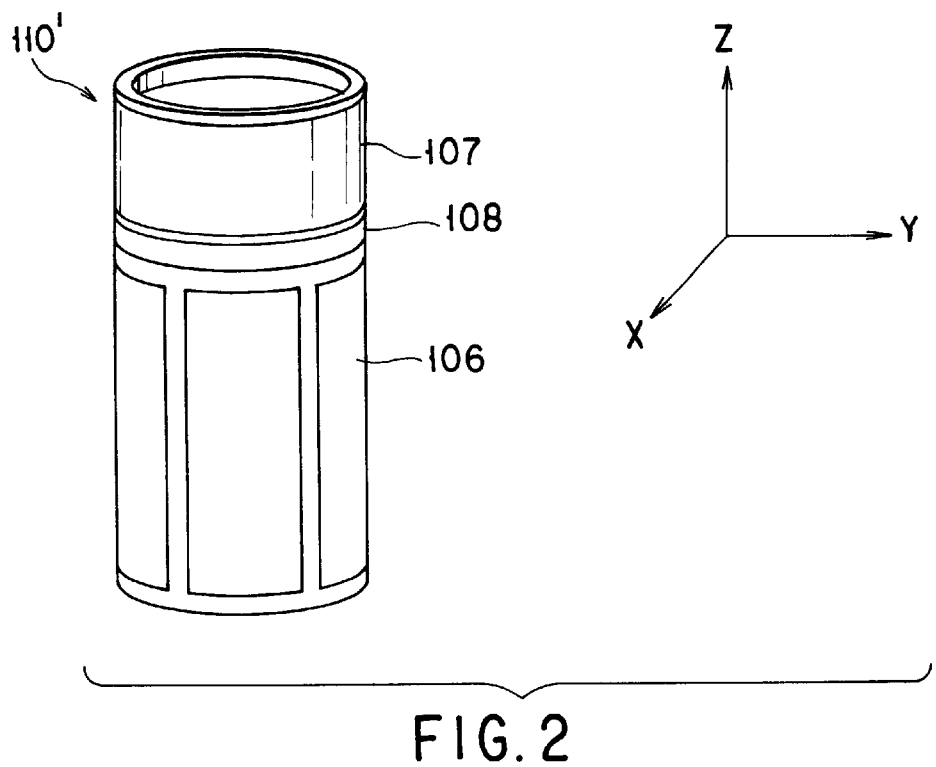
FIG. 2
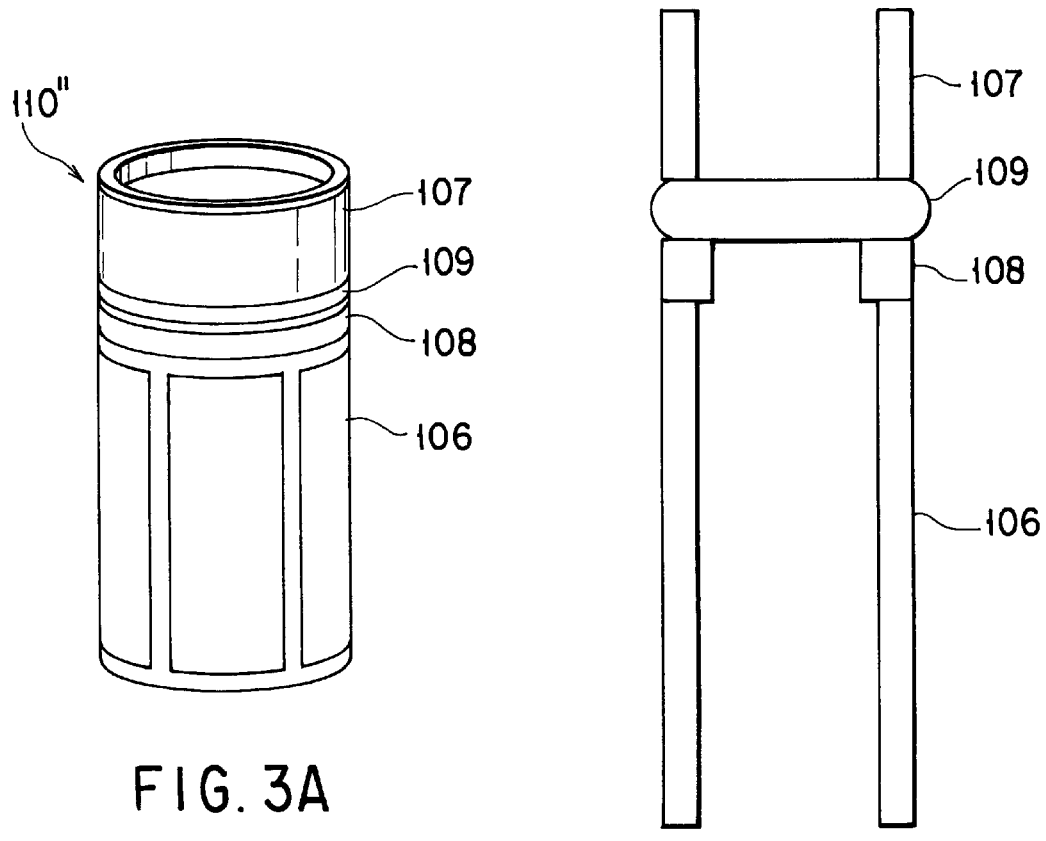
FIG. 3A
FIG. 3B

SCANNER SYSTEM AND PIEZOELECTRIC MICRO-INCHING MECHANSIM USED IN SCANNING PROBE MICROSCOPE

BACKGROUND OF THE INVENTION

The present invention relates to a scanning probe microscope capable of measuring specimen surface information with atomic-order resolution, and more particularly, to a scanner system and a piezoelectric micro-inching mechanism used in a scanning probe microscope.

Scanning tunneling microscopes (STMs) and atomic force microscopes (AFMs) are typical examples of scanning probe microscopes (SPMs).

In the scanning tunneling microscopes, which are the original version of scanning probe microscopes, the surface shape of a specimen is measured with atomic-order resolution by utilizing a tunneling current flowing between a metallic probe and an electrically conductive specimen which are located close to each other. Utilizing the tunneling current, the scanning tunneling microscopes is used to observe electrically conductive specimens only.

The atomic force microscopes have been developed by utilizing the servo technique and other STM techniques. In these microscopes, the surface shape of a specimen is measured with atomic-order resolution by utilizing an atomic force which acts between atoms in the apex of a probe and the surface of a specimen. Accordingly, the atomic force microscopes is used to observe electrically insulating specimens as well as conductive ones.

In order to enjoy high resolution, the scanning probe microscopes require a scanning mechanism that can control the relative positions of the probe and the specimen with high accuracy. In general, these microscopes use a piezoelectric micro-inching mechanism, especially a cylindrical piezoelectric scanner or so-called tube scanner.

First Prior Art

FIGS. 11A, 11B and 11C show an arrangement of one such tube scanner. FIG. 11A is a perspective view of the tube scanner, FIG. 11B is a development showing outside electrodes of the scanner, and FIG. 11C is a development showing an inside electrode.

A tube scanner 1040 comprises a piezoelectric ceramic 1041 in the form of a hollow cylinder, Z-axis driving electrode 1044, X-axis driving electrodes 1042*a* and 1042*b*, Y-axis driving electrodes 1043*a* and 1043*b*, and common electrode 1045. The electrodes 1044, 1042*a*, 1042*b*, 1043*a* and 1043*b* are arranged outside the ceramic 1041, and the electrode 1045 inside. The X-axis driving electrodes 1042*a* and 1042*b* are located in positions at an angular distance of 90° from the Y-axis driving electrodes 1043*a* and 1043*b*, respectively. The Z-axis driving electrode 1044, X-axis driving electrodes 1042*a* and 1042*b*, and Y-axis. driving electrodes 1043*a* and 1043*b* face the common electrode 1045 across the piezoelectric ceramic 1045.

The tube scanner 1040 is displaced in the X-axis direction as opposite-polarity voltages are applied to the X-axis driving electrodes 1042*a* and 1042*b*, individually, with the common electrode 1045 grounded, and is displaced in the Y-axis direction as opposite-polarity voltages are applied to the Y-axis driving electrodes 1043*a* and 1043*b*, individually. The piezoelectric ceramic 1041 extends or contracts to be displaced in the Z-axis direction, depending on the polarity of a voltage applied to the Z-axis driving electrode 1044.

In order to obtain a substantial displacement in the Z-axis direction in the tube scanner shown in FIGS. 11A to 11C, the height of the Z-axis driving electrode 1044 or the voltage applied thereto must be increased.

If the height of the Z-axis driving electrode 1044 is increased, however, the tube scanner 104 is lengthened inevitably, resulting in lowered resonance frequency and hence poorer responsivity.

An expensive power source and a driver circuit are needed to apply a high voltage to the Z-axis driving electrode 1044 to drive it.

Second Prior Art

An example of a scanning probe microscope which uses a tube scanner is described in Jpn. Pat. Appln. KOKAI Publication No. 5-312564. FIG. 12 shows a configuration of this microscope.

As shown in FIG. 12, a specimen 1103 is fixed to a free end of a cylindrical piezoelectric element (tube scanner) 1102. The piezoelectric element 1102 is moved for scanning in the X- and Y-directions in response to X- and Y-scan signals which are generated from an X-scan signal generator 1111 and a Y-scan signal generator 1112, respectively. Thus, the specimen 1103 on the piezoelectric element 1102 is scanned in the X- and Y-directions. The cantilever 1104, which is located close to the specimen 1103, is deflected in the Z-direction, depending on the surface irregularity of the specimen 1103.

Light emitted from a laser diode 1105 is reflected by a mirror 1106, to be incident upon the surface of the cantilever 1104, and the reflected light is projected on a photodiode 1107. The deflection of the cantilever 1104 is detected by monitoring the position of a beam spot on the photodiode 1107 by means of a differential amplifier 1108. The cylindrical piezoelectric element 1102 is feedback-controlled in the Z-direction by means of a servo circuit 1109 to keep the deflection constant.

If a computer 1110 directly fetches as height information or surface irregularity information a voltage applied to the piezoelectric element to drive it in the Z-direction, an obtained image is subject to distortion attributable to hysteresis, creeping, etc., which are peculiar to the piezoelectric element.

Accordingly, an optical fiber 1114 is located inside the cylindrical piezoelectric element 1102, and the Z-direction displacement of a mirror 1116 is detected through the fiber 1114 by means of optical interferometer 1115. The computer 1110 fetches the resulting displacement signal as height information or surface irregularity information, thereby forming a surface irregularity image.

Referring now to FIG. 13, there will be described a drawback of the system shown in FIG. 12. If the cylindrical piezoelectric element 1102 is displaced in the X-direction, as shown in FIG. 13, the mirror 1116 located on the undersurface of a specimen stage 1120 which is fixed to the free end of the element 1102, is displaced at an angle to the end face of the optical fiber 1114 in the X-direction.

Accordingly, an object of measurement by means of the optical interferometer 1115 shifts its position from a point a on the mirror 1116 to another point b. Therefore, a Z-displacement measured by the interferometer 1115 involves the influence of change of the inclination of the mirror 1116 or surface conditions. Thus, the shifts of the inclination of the object of measurement and the measuring position, which are caused as the tube scanner is displaced in the X-direction, are primary factors that lower the accuracy of the Z-displacement measurement.

Third Prior Art

A scanning probe microscope in which an optical microscope is incorporated in an atomic force microscope is described in Jpn. Pat. Appln. KOKAI Publication No. 8-285865. As shown in FIG. 14, for example, this microscope comprises a quadruple scanner 1206 having a quadruple electrode, a cantilever displacement sensor 1208 in the form of an optical lever, and an objective lens 1210 for optical microscope. The scanner 1206 moves a cantilever 1202 with respect to a specimen 1204. The sensor 1208 optically detects the deflective displacement of a free end of the cantilever 1202, which is based on the interaction, e.g., atomic force or frictional force or adsorptive force or contact force, between the apex of a probe 1212 and the specimen 1204. The objective lens 1210 is inserted in the scanner 1206 so that a scanning region for the cantilever 1202, i.e., the surface of the specimen 1204, can be optically observed through the lens 1210.

After the probe 1212 on the cantilever 1202 is situated in the scanning region with use of the objective lens 1210, the scanner is 1206 is feedback-controlled in the Z-direction in response to a Z-displacement signal from the displacement sensor 1208. At the same time, the distance between the apex of the probe 1212 and the surface of the specimen 1204 is kept constant as the probe 1212 is moved for scanning in the X- and Y-directions. Thus, specimen information based on the aforesaid interaction is detected and displayed.

In this scanning probe microscope, both the displacement sensor 1208 and the cantilever 1202 are mounted on the end of the quadruple scanner 1206, so that the resonance frequency of the scanner 1206 is not very high. Inevitably, therefore, the scanning speed of the scanner 1206 is so low that the measuring time cannot be shortened. Since the rigidity of the scanner 1206 is low, moreover, measurement data are susceptible to vibration and other disturbance noises.

BRIEF SUMMARY OF THE INVENTION

First Aspect of the Invention

An object of the present invention is to provide a piezoelectric micro-inching mechanism capable of enlarging displacement in the Z-axis direction without requiring use of high driving voltage or lowering its resonance frequency.

In order to achieve the above object, a piezoelectric micro-inching mechanism according to a first aspect of the invention comprises: a first piezoelectric drive section displaceable along a first axis and a second axis; and a second piezoelectric drive section displaceable along a third axis perpendicular to the first and second axes, the first and second piezoelectric drive sections being formed integrally with each other, the first piezoelectric drive section including a cylindrical piezoelectric element, a common electrode internally surrounding the inside of the piezoelectric element, and four driving electrodes arranged at intervals in the circumferential direction outside the piezoelectric element, the second piezoelectric drive section including a cylindrical piezoelectric element, an inside electrode internally surrounding the inside of the piezoelectric element, and an outside electrode surrounding the outside of the piezoelectric element.

Here "the first and second piezoelectric drive sections being formed integrally with each other" implies both a structure that includes the first and second piezoelectric drive sections comprising the common electrode, driving electrodes, and inside and outside electrodes provided for the one cylindrical piezoelectric element and a structure obtained by connecting the first and second piezoelectric drive sections that are formed separately from each other.

The first and second piezoelectric drive sections are connected by bonding them directly or by means of a connecting member or by means of an elastic member as well as the connecting member.

Normally, the common electrode of the first piezoelectric drive section is grounded, and opposite-polarity voltages are applied individually to two opposite driving electrodes so that the first piezoelectric drive section is displaced along the first or second axis. Preferably, the second piezoelectric drive section is displaced along the third axis as opposite-polarity voltages are applied individually to its inside and outside electrodes. This displacement doubles the displacement that is obtained with the inside electrode grounded.

Second Aspect of the Invention

Another object of the invention is to provide a scanner system for a scanning probe microscope capable of accurately measuring the Z-displacement of an object of scanning.

In order to achieve the above object, a scanner system according to a second aspect of the invention comprises: a holding section for holding an object of scanning; a Z-displacement generator for applying a Z-direction displacement to the holding section; an XY-displacement generator for applying X- and Y-direction displacements to the holding section; a connecting member for connecting the Z-displacement generator and the XY-displacement generator; and a Z-displacement detector for detecting the Z-direction displacement of the holding section. The holding section is provided directly on the Z-displacement generator, while the Z-displacement detector is attached to the connecting member.

The XY-displacement generator comprises a cylindrical piezoelectric scanner including a cylindrical piezoelectric element, a common electrode internally surrounding the inner peripheral surface of the piezoelectric element, and four driving electrodes arranged at intervals in the circumferential direction of the outer peripheral surface of the piezoelectric element, for example. The Z-displacement generator comprises a cylindrical piezoelectric actuator including a cylindrical piezoelectric element, an inside electrode internally surrounding the inner peripheral surface of the piezoelectric element, and an outside electrode surrounding the outer peripheral surface of the piezoelectric element.

Further, the Z-displacement detector is situated inside the cylindrical piezoelectric actuator.

Third Aspect of the Invention

Still another object of the invention is to provide a scanner system for a scanning probe microscope, enjoying high resonance frequency and high rigidity.

In order to achieve the above object, a scanner system according to a third aspect of the invention comprises: a scanning mechanism for moving a probe on a cantilever in horizontal directions along the surface of a specimen to be scanned; a moving mechanism for moving the probe on the cantilever in a vertical direction with respect to the specimen; and a displacement detecting mechanism situated between the scanning mechanism and the moving mechanism and capable of detecting the displacement of the cantilever.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1A to 1C show a piezoelectric micro-inching mechanism according to a first embodiment of the invention, in which FIG. 1A is a side view of the mechanism, FIG. 1B is an external development, and FIG. 1C is an internal development;

FIG. 2 is a perspective view of a piezoelectric micro-inching mechanism according to a second embodiment of the invention;

FIGS. 3A and 3B show a piezoelectric micro-inching mechanism according to a third embodiment of the invention, in which FIG. 3A is a perspective view of the mechanism and FIG. 3B is a side sectional view;

FIGS. 11A to 11C show a conventional piezoelectric micro-inching mechanism, in which FIG. 11A is a side view of the mechanism, FIG. 11B is an external development, and FIG. 11C is an internal development;

DETAILED DESCRIPTION OF THE INVENTION

Preferred embodiments of the present invention will now be described with reference to the accompanying drawings.

First Embodiment of the Invention

Figure 1A:
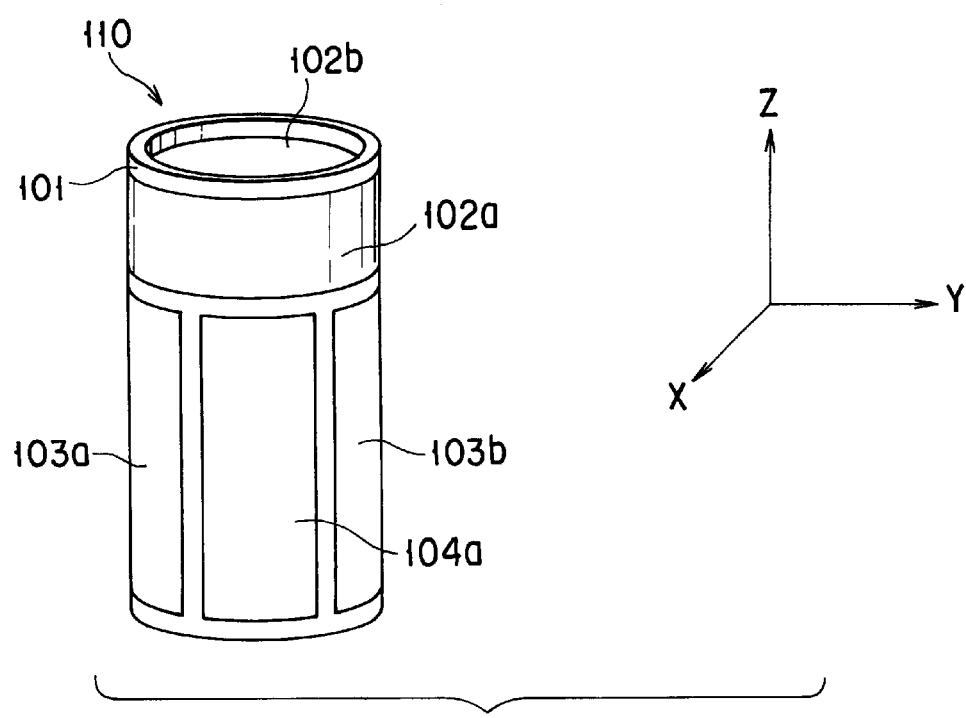
Figure 1B:
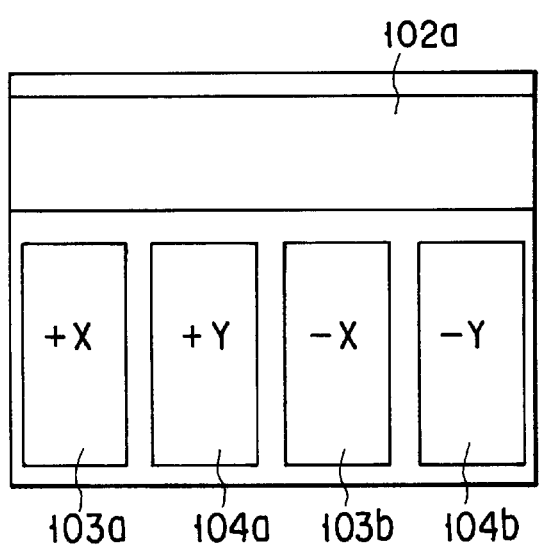
Figure 1C:
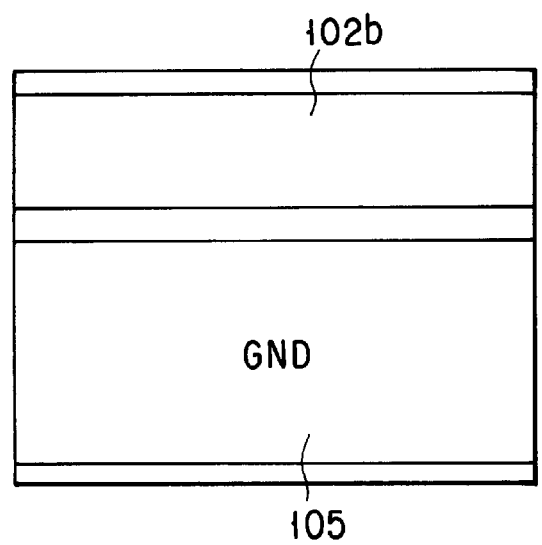

Referring first to FIG. 1, there will be described a piezoelectric micro-inching mechanism according to a first embodiment of the invention. FIG. 1A is a perspective view of a tube scanner as the piezoelectric micro-inching mechanism according to the present embodiment, FIG. 1B is a development showing an arrangement of outside electrodes of the scanner, and FIG. 1C is a development showing an arrangement of inside electrodes.

A tube scanner 110 comprises a piezoelectric ceramic 101 in the form of a hollow cylinder and a plurality of electrodes inside and outside the ceramic 101. A Z-axis outside electrode 102a surrounds the outside of the ceramic 101, and four slip-shaped driving electrodes 103a, 104a, 103b and 104b are arranged at intervals in the circumferential direction outside the ceramic 101. The four driving electrodes 103a, 104a, 103b and 104b have the same shape and area. The X-axis driving electrodes 103a and 103b are situated symmetrically with respect to the axis of the cylindrical piezoelectric ceramic 101. Likewise, the Y-axis driving electrodes 104a and 104b are situated symmetrically with respect to the axis of the ceramic 101. Further, the X-axis driving electrodes 103a and 103b are located in positions at an angular distance of 90° from the Y-axis driving electrodes 104a and 104b, respectively.

A Z-axis inside electrode 102b and an XY-axis common electrode (GND) 105 are formed internally surrounding the piezoelectric ceramic 101. The Z-axis inside electrode 102b faces the Z-axis outside electrode 102a across the ceramic 101, while the XY-axis common electrode 105 faces the X-axis driving electrodes 103a and 103b and the Y-axis driving electrodes 104a and 104b across the ceramic 101.

In this structure, the X-axis driving electrodes 103a and 103b, Y-axis driving electrodes 104a and 104b, XY-axis common electrode 105, and those portions of the piezoelectric ceramic 101 which are sandwiched between them constitute a piezoelectric drive section for XY-axis drive. The Z-axis outside electrode 102a, Z-axis inside electrode 102b, and those portions of the ceramic 101 which are sandwiched between them constitute a piezoelectric drive section for Z-axis drive.

The piezoelectric micro-inching mechanism or tube scanner 110 according to the present embodiment is displaced in the Z-axis direction as opposite-polarity voltages are applied to the Z-axis outside electrode 102a and the Z-axis inside electrode 102b, individually. More specifically, the scanner 110 is displaced in its contracting direction as voltages +V and −V are applied to the electrodes 102a and 102b, respectively, and is displaced in its extending direction as the voltages −V and +V are applied to the electrodes 102a and 102b, respectively.

Figure 11A:
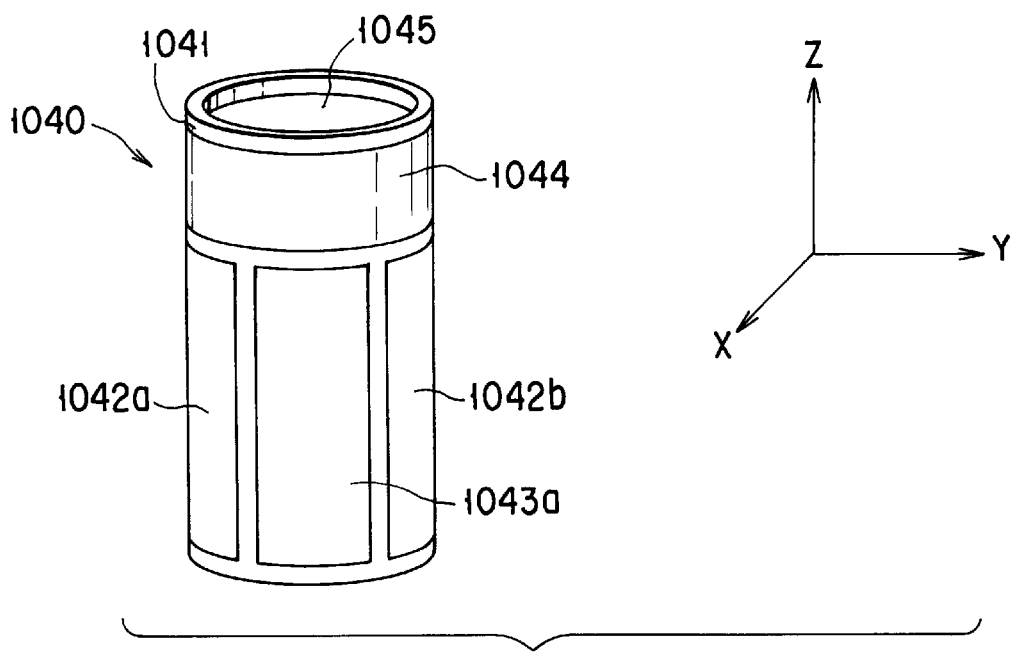
Figure 11B:
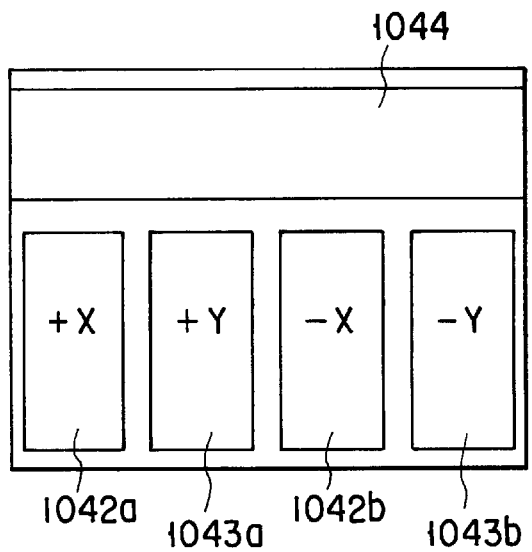
Figure 11C:
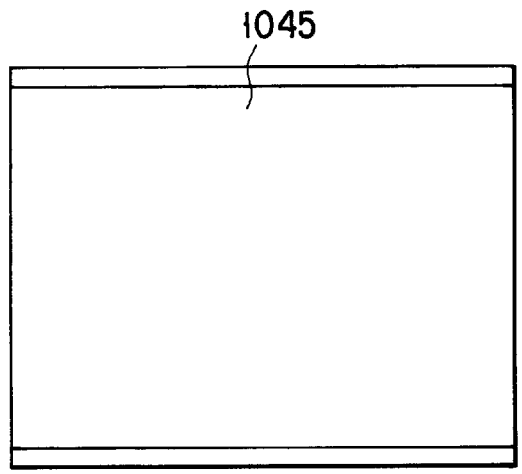
Figure 12:
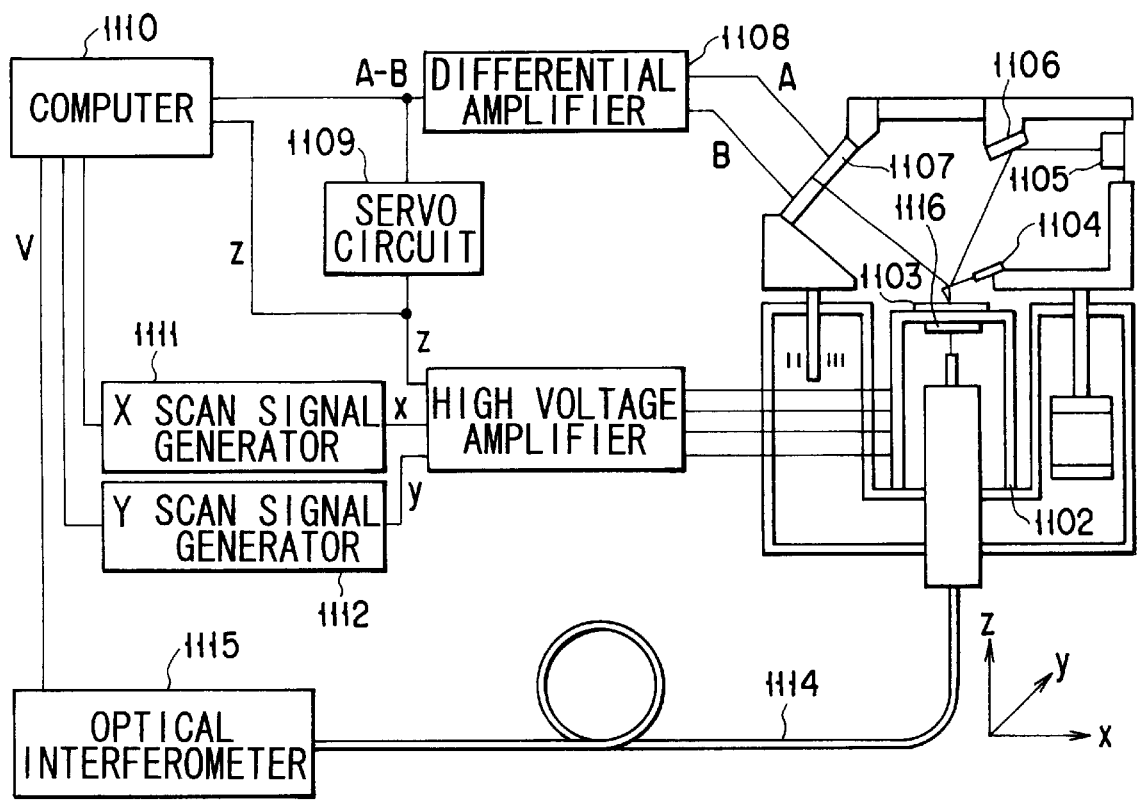
FIG. 12 shows an arrangement of a scanning probe microscope using a conventional piezoelectric tube scanner.
Figure 13:
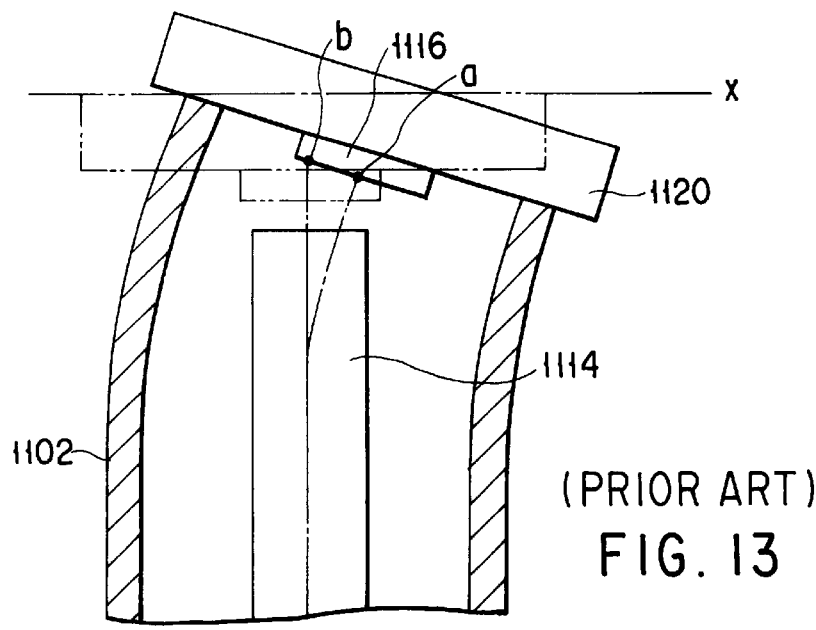
FIG. 13 is a view for illustrating a drawback of the system shown in FIG. 12.

As the voltages are applied in this manner, a displacement is obtained doubling the displacement in the Z-axis direction that is obtained when voltage is applied to only the outside electrode 1044 with the inside common electrode 1045 grounded, in the conventional tube scanner 1040 of the same size shown in FIGS. 11A to 11C. In other words, the conventional Z-direction displacement is obtained with use of a scanner length half that of the conventional tube scanner.

Further, the scanner 110 is displaced in the X-axis direction as opposite-polarity voltages are applied to the X-axis driving electrodes 103a and 103b, individually, with the XY-axis common electrode 105 grounded, and is displaced in the Y-axis direction as opposite-polarity voltages are applied to the Y-axis driving electrodes 104a and 104b, individually.

As is evident from the above description, the tube scanner according to the present embodiment realizes the same Z-direction displacement for the same driving voltages as in the conventional case, despite its length shorter than the conventional one. Thus, the piezoelectric micro-inching mechanism according to the present embodiment enjoys high resonance frequency, and therefore high responsivity, without failing to achieve the same Z-direction displacement as in the conventional case.

Second Embodiment of the Invention

Referring now to FIG. 2, there will be described a piezoelectric micro-inching mechanism according to a second embodiment of the invention.

A tube scanner 110' as the piezoelectric micro-inching mechanism according to the present embodiment comprises a XY-axis piezoelectric drive section 106 and a Z-axis piezoelectric drive section 107, which are separate structures bonded together into a united body by means of a connecting member 108.

The XY-axis piezoelectric drive section 106 is a structure equivalent to the structure according to the first embodiment which comprises the X-axis driving electrodes 103a and 103b, Y-axis driving electrodes 104a and 104b, XY-axis common electrode 105, and those portions of the piezoelectric ceramic 101 which are sandwiched between them. The Z-axis piezoelectric drive section 107 is a structure equivalent to the structure according to the first embodiment which comprises the Z-axis outside electrode 102a, Z-axis inside electrode 102b, and those portions of the ceramic 101 which are sandwiched between them.

The piezoelectric micro-inching mechanism according to the present embodiment, like the one according to the first embodiment, enjoys high resonance frequency, and therefore high responsivity, without failing to achieve the same Z-direction displacement as in the conventional case.

In the piezoelectric micro-inching mechanism according to the present embodiment, the XY-axis piezoelectric drive section 106 and the Z-axis piezoelectric drive section 107 comprise separate structures, so that the piezoelectric effect of one of these sections cannot easily influence the other.

Third Embodiment of the Invention

Referring now to FIGS. 3A and 3B, there will be described a piezoelectric micro-inching mechanism according to a third embodiment of the invention.

A tube scanner 110" as the piezoelectric micro-inching mechanism according to the present embodiment comprises a XY-axis piezoelectric drive section 106 and a Z-axis piezoelectric drive section 107, which are separate structures bonded together into a united body by means of a connecting member 108 and an elastic member 109.

Preferably, the elastic member should comprise a material of which the loss factor (tan $\delta = (\tau^2-1)^{-\frac{1}{2}}$, where $\tau$ is a resonance transmissibility) is not lower than 1.0 (frequency at 100 Hz, temperature at 20° C.). The loss factor represents the degree of internal attenuation of a substance. The higher the loss factor, the greater the internal attenuation of a vibration-deadening material is, and the lower the resonance transmissibility (resonance magnification) of the vibration-deadening material is, that is, the lower the resonance Q-value is.

Materials with this property include, for example, a silicon-based gel material and vibration-damping rubber. The loss factor of ordinary rubber ranges from about 0.2 to 0.3 (frequency at 100 Hz, temperature at 20° C.).

The XY-axis piezoelectric drive section 106 is a structure equivalent to the structure according to the first embodiment which comprises the X-axis driving electrodes 103a and 103b, Y-axis driving electrodes 104a and 104b, XY-axis common electrode 105, and those portions of the piezoelectric ceramic 101 which are sandwiched between them. The Z-axis piezoelectric drive section 107 is a structure equivalent to the structure according to the first embodiment which comprises the Z-axis outside electrode 102a, Z-axis inside electrode 102b, and those portions of the ceramic 101 which are sandwiched between them.

The piezoelectric micro-inching mechanism according to the present embodiment, like the one according to the first embodiment, enjoys high resonance frequency, and therefore high responsivity, without failing to achieve the same Z-direction displacement as in the conventional case.

Further, the elastic member 109 interposed between the XY-axis piezoelectric drive section 106 and the Z-axis piezoelectric drive section 107, lowers the resonance Q-value, so that the realized piezoelectric micro-inching mechanism enjoys higher responsivity.

Fourth Embodiment of the Invention

Figure 4:
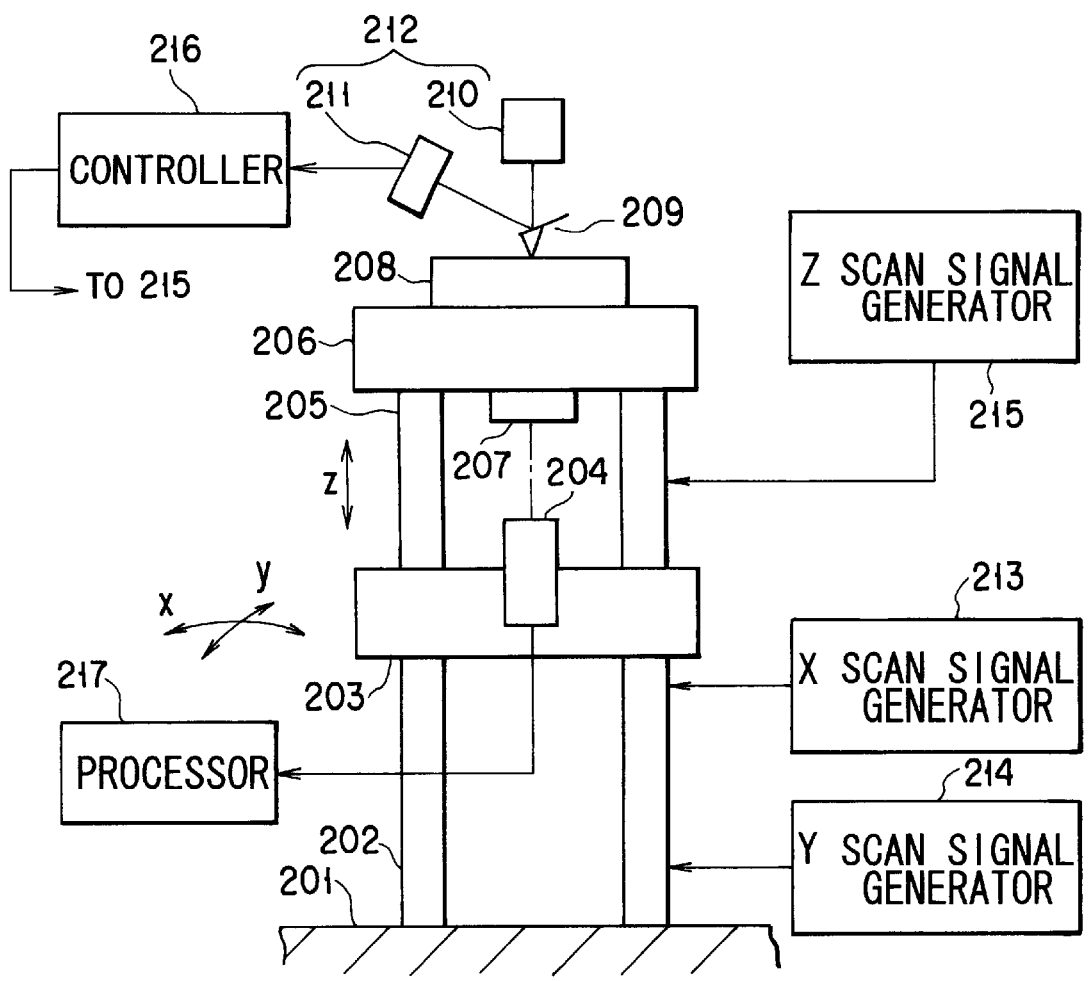
FIG. 4 shows a scanning probe microscope with a scanner system according to a fourth embodiment of the invention.

Referring now to FIG. 4, there will be described a scanner system according to a fourth embodiment of the invention. FIG. 4 shows a scanning probe microscope with the scanner system according to the present embodiment.

As shown in FIG. 4, an XY-displacement generator 202 displaceable in the X- and Y-directions is fixed firmly on a base 201. A connecting member 203 is fixed to a free end of the generator 202, and a Z-displacement generator 205 is located on top of the member 203.

Figure 5A:
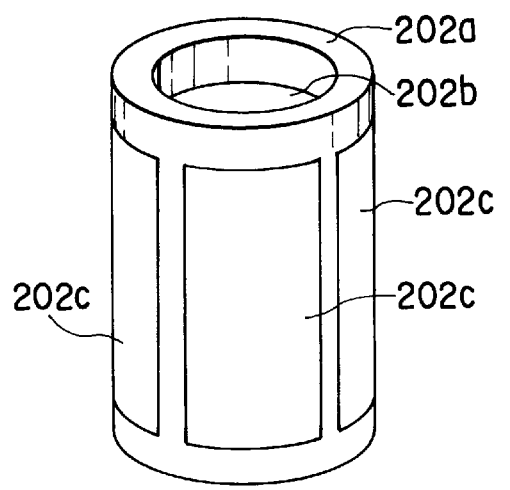
FIG. 5A is a perspective view of a cylindrical piezoelectric scanner for use as an XY-displacement generator shown in FIG. 4.

As shown in FIG. 5A, for example, the XY-displacement generator 202 comprises a cylindrical piezoelectric scanner or a so-called tube scanner, which includes a cylindrical piezoelectric element 202a, a common electrode 202b internally surrounding the inner peripheral surface of the piezoelectric element 202a, and four driving electrodes 202c arranged at intervals in the circumferential direction on the outer peripheral surface of the element 202a.

Figure 5B:
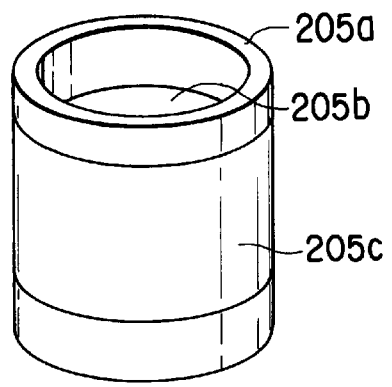
FIG. 5B is a perspective view of a cylindrical piezoelectric actuator for use as a Z-displacement generator shown in FIG. 4.

As shown in FIG. 5B, for example, the Z-displacement generator 205 comprises a cylindrical piezoelectric actuator, which includes a cylindrical piezoelectric element 205a, an inside electrode 205b internally surrounding the inner peripheral surface of the piezoelectric element 205a, and an outside electrode 205c surrounding the outer peripheral surface of the element 205a.

A specimen stage 206 is fixed on the Z-displacement generator 205, and a specimen 208 is placed on the stage 206. In other words, the stage 206 for use as a holding section for holding the specimen 208, an object of scanning, is fixed to the upper end of the cylindrical piezoelectric actuator 205. A Z-displacement detector 204 is provided in the central portion on the upper side of the connecting member 203, and a target 207 for the detector 204 is fixed to the underside of the stage 206. For example, the detector 204 may comprise a capacitance sensor for detecting capacitance between itself and the target 207, which varies depending on the distance between the two, and an optical interferometer as an example of an optical displacement detecting system.

A cantilever 209 fixed to a fixing member (not shown) is located close to the surface of the specimen 208. The cantilever 209 is overlain by a cantilever sensor 212 which comprises a light source section 210 and a light receiving section 211.

The following is a detailed description of measurement by means of the scanning probe microscope described above.

The XY-displacement generator 202, which is fixed to the base 201, is moved for scanning in the X- and Y-directions in response to scan signals from an X-scan signal generator 213 and a Y-scan signal generator 214. The free end of the XY-displacement generator, e.g., the cylindrical piezoelectric scanner 202 shown in FIG. 5A, is displaced in the X-direction as opposite-polarity voltages are applied individually to the two driving electrodes 202c that are situated symmetrically in the X-direction. Thus, the connecting member 203, which is fixed to the free end of the scanner 202, moves in the X-direction, and the Z-displacement generator 205 and the stage 206, which overlie the member 203, also move in the X-direction. In consequence, the specimen 208 is moved for scanning in the X-direction with respect to the cantilever 209. The specimen 208 is also moved for scanning in the Y-direction in like manner.

The free end portion of the cantilever 209 is displaced and changes its angle depending on the surface irregularity of the specimen 208. A light beam from the light source section 210 that is applied to the cantilever 209 is reflected in a direction corresponding to the angle of the free end portion of the cantilever 209, and the position of a spot formed on the light receiving section 211 changes. The light receiving section 211 comprises a double photodiode or some other element which delivers an output signal corresponding to the spot position, and the output signal is supplied to a controller 216.

The controller 216 supplies a Z-scan signal generator 215 with a servo signal for feedback-controlling the Z-displacement generator 205 so that the signal from the light receiving section 211 or the signal from the cantilever sensor 212 is maintained.

As same-polarity or opposite-polarity voltages are applied individually to the inside and outside electrodes 205b and 205c so that a potential difference is provided between them, the Z-displacement generator 205, such as the cylindrical piezoelectric actuator of FIG. 5B, extends or contracts in the axial direction depending on the polarity of the potential difference. Accordingly, the specimen stage 206, which is fixed to a free end of the actuator 205, is moved in the axial direction, whereupon the specimen 208 is moved for scanning in the Z-direction with respect to the cantilever 209.

The Z-displacement generator 205 comprises a structure equivalent to the already explained Z-axis piezoelectric drive section 107 in the second and third embodiments. Consequently, as voltages +V and −V are applied to the inside and outside electrodes 202b and 202c, respectively, the conventional Z-direction displacement is obtained with use of a scanner length shorter than that of the conventional one. Thus, the scanner system according to the present embodiment enjoys high resonance frequency, and therefore high responsivity, without failing to achieve the same Z-direction displacement as in the conventional case.

In this scanning probe microscope, the distance between the Z-displacement detector 204 and the target 207 changes as the specimen 208 is moved for scanning in the Z-direction with respect to the cantilever 209. The detector 204 detects this distance, and its output signal is supplied to a processor 217.

The processor 217 fetches the signal from the Z-displacement detector 204 as height information or surface irregularity information for the specimen 208, and processes it together with position information based on the scan signals from the X- and Y-scan signal generators 213 and 214. Thereupon, an image corresponding to the surface shape of the specimen 208 is formed and displayed on a monitor (not shown).

Preferably, in order to eliminate influences of hysteresis and creeping of the cylindrical piezoelectric scanner 202, position information along the surface of the specimen 208 should be obtained not from the scan signals from the X- and Y-scan signal generators 213 and 214, but from information from a separate displacement sensor which detects X- and Y-direction displacements of the specimen 208.

This technique is already disclosed in U.S. Pat. No. 5,526,165 and Jpn. Pat. Appln. KOKAI Publications No. 8-285865 by the inventor hereof, for example, and the contents of these patent and publication are incorporated herein by reference.

The specimen 208 is moved for scanning in the X- and Y-directions with respect to the cantilever 209, depending on the curvature of the cylindrical piezoelectric scanner 202. However, the curvature of the scanner 202 does not influence the relative positions of the Z-displacement detector 204 and the target 207. Thus, the XY-scanning neither causes the inclination of the target 207 to the detector 204 to change nor causes a point of measurement on the target 207 for measurement by means of the detector 204 to move.

According to the present embodiment, therefore, the Z-direction displacement of the target 207 with respect to the Z-displacement detector 204 is measured accurately. Thus, more accurate surface height information is obtained for the specimen 208, so that the surface shape of the specimen 208 is measured with higher accuracy.

Fifth Embodiment of the Invention

Figure 6:
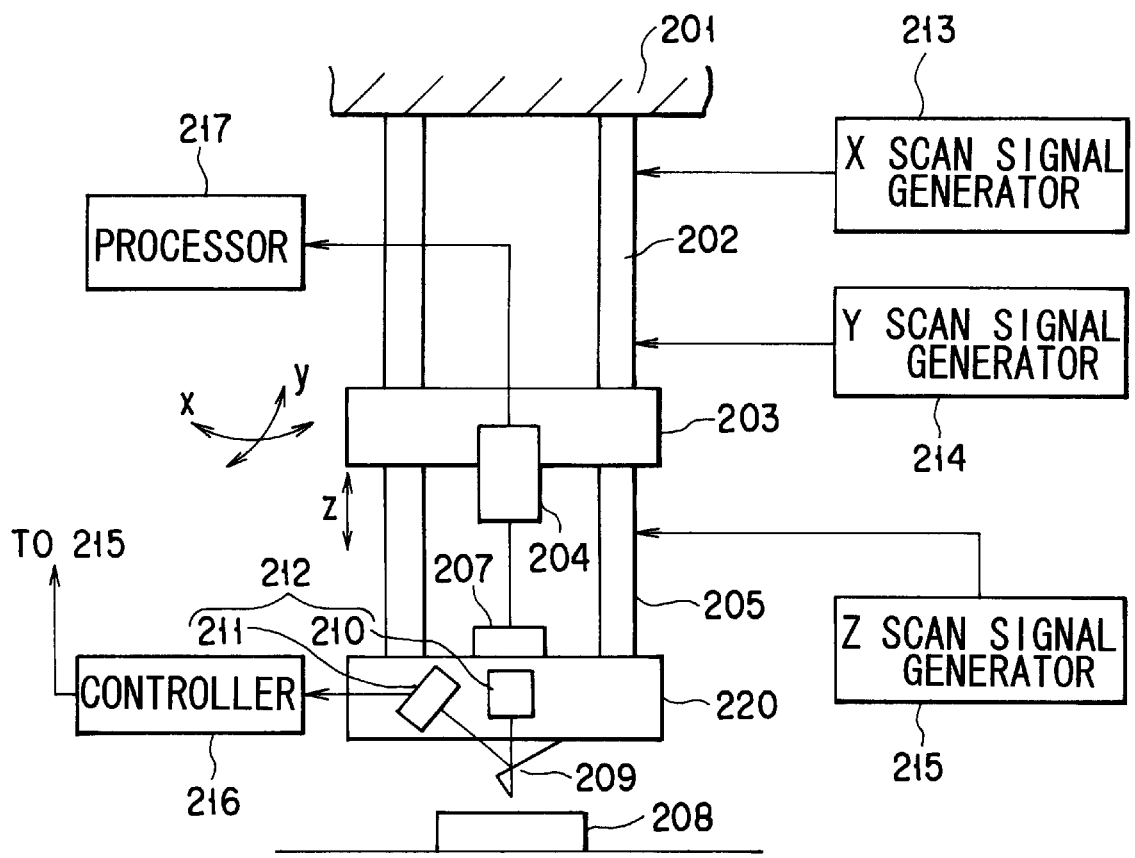
FIG. 6 shows a scanning probe microscope with a scanner system according to a fifth embodiment of the invention.

Referring now to FIG. 6, there will be described a scanner system according to a fifth embodiment of the invention. FIG. 6 shows a scanning probe microscope with the scanner system according to the present embodiment.

As shown in FIG. 6, an XY-displacement generator 202 displaceable in the X- and Y-directions is supported on a base 201. A connecting member 203 is fixed to a free end of the generator 202, and a Z-displacement generator 205 is fixed to the underside of the member 203.

The XY-displacement generator 202 comprises a cylindrical piezoelectric scanner, such as the one described in connection with the fourth embodiment shown in FIG. 5A, for example. Likewise, the Z-displacement generator 205 comprises a cylindrical piezoelectric actuator, such as the one described in connection with the fourth embodiment shown in FIG. 5B, for example.

A cantilever fixing member 220 is fixed to the lower end of the Z-displacement generator 205, and a cantilever 209 is attached to the underside of the member 220. The member 220 has therein a cantilever sensor 212, which comprises a light source section 210 and a light receiving section 211. The cantilever 209 is located close to the surface of the specimen 208.

A Z-displacement detector 204 is provided in the central portion on the underside of the connecting member 203, and a target 207 for the detector 204 is located on the central portion of the top surface of the cantilever fixing member 220. For-example, the detector 204 may comprise a capacitance sensor for detecting capacitance between itself and the target 207, which varies depending on the distance between the two, and an optical interferometer as an example of an optical displacement detecting system.

The following is a detailed description of measurement by means of the scanning probe microscope described above.

The XY-displacement generator 202, which is fixed to the base 201, is moved for scanning in the X- and Y-directions in response to scan signals from an X-scan signal generator 213 and a Y-scan signal generator 214. The free end of the XY-displacement generator, e.g., the cylindrical piezoelectric scanner 202 shown in FIG. 5A, is displaced in the X-direction as opposite-polarity voltages are applied individually to the two driving electrodes 202c that are situated symmetrically in the X-direction. Thus, the connecting member 203, which is fixed to the free end of the scanner 202, moves in the X-direction, and the Z-displacement generator 205 and the cantilever fixing member 220, which are supported by the member 203, also move in the X-direction. In consequence, the cantilever 209 is moved for scanning in the X-direction with respect to the specimen 208. The cantilever 209 is also moved for scanning in the Y-direction in like manner.

The free end portion of the cantilever 209 is displaced and changes its angle depending on the surface irregularity of the specimen 208. A light beam from the light source section 210 that is applied to the cantilever 209 is reflected in a direction corresponding to the angle of the free end portion of the cantilever 209, and the position of a spot formed on the light receiving section 211 changes. The light receiving section 211 comprises a double photodiode or some other element which delivers an output signal corresponding to the spot position, and the output signal is supplied to a controller 216.

The controller 216 supplies a Z-scan signal generator 215 with a servo signal for feedback-controlling the Z-displacement generator 205 so that the signal from the light receiving section 211 is maintained.

As same-polarity or opposite-polarity voltages are applied individually to the inside and outside electrodes 205b and 205c so that a potential difference is provided between them, the Z-displacement generator 205, such as the cylindrical piezoelectric actuator of FIG. 5B, extends or contracts in the axial direction depending on the polarity of the potential difference. Accordingly, the cantilever fixing member 220, which is fixed to the free end of the actuator 205, is moved in the axial direction, whereupon the cantilever 209 is moved for scanning in the Z-direction with respect to the specimen 208.

The Z-displacement generator 205 comprises a structure equivalent to the already explained Z-axis piezoelectric drive section 107 in the second and third embodiments. Consequently, as voltages +V and −V are applied to the inside and outside electrodes 202b and 202c, respectively, the conventional Z-direction displacement is obtained with use of a scanner length shorter than that of the conventional one. Thus, the scanner system according to the present embodiment enjoys high resonance frequency, and therefore high responsivity, without failing to achieve the same Z-direction displacement as in the conventional case.

In this scanning probe microscope, the distance between the Z-displacement detector 204 and the target 207 changes as the specimen 208 is moved for scanning in the Z-direction with respect to the cantilever 209. The detector 204 detects this distance, and its output signal is supplied to a processor 217.

The processor 217 fetches the signal from the Z-displacement detector 204 as height information or surface irregularity information for the specimen 208, and processes it together with position information based on the scan signals from the X- and Y-scan signal generators 213 and 214. Thereupon, an image corresponding to the surface shape of the specimen 208 is formed and displayed on a monitor (not shown).

Preferably, in order to eliminate influences of hysteresis and creeping of the cylindrical piezoelectric scanner 202, position information along the surface of the specimen 208 should be obtained not from the scan signals from the X- and Y-scan signal generators 213 and 214, but from information from a separate displacement sensor which detects X- and Y-direction displacements of the specimen 208.

This technique is already disclosed in Jpn. Pat. Appln. KOKAI Publications Nos. 6-229753 and 8-285865 by the inventor hereof, for example, and the contents of these publications are incorporated herein by reference.

The cantilever 209 is moved for scanning in the X- and Y-directions with respect to the specimen 208, depending on the curvature of the cylindrical piezoelectric scanner 202. However, the curvature of the scanner 202 does not influence the relative positions of the Z-displacement detector 204 and the target 207. Thus, the XY-scanning neither causes the inclination of the target 207 to the detector 204 to change nor causes a point of measurement on the target 207 for measurement by means of the detector 204 to move.

According to the present embodiment, therefore, the Z-direction displacement of the target 207 with respect to the Z-displacement detector 204 is measured accurately. Thus, more accurate surface height information is obtained for the specimen 208, so that the surface shape of the specimen 208 is measured with higher accuracy.

Sixth Embodiment of the Invention

Figure 7:
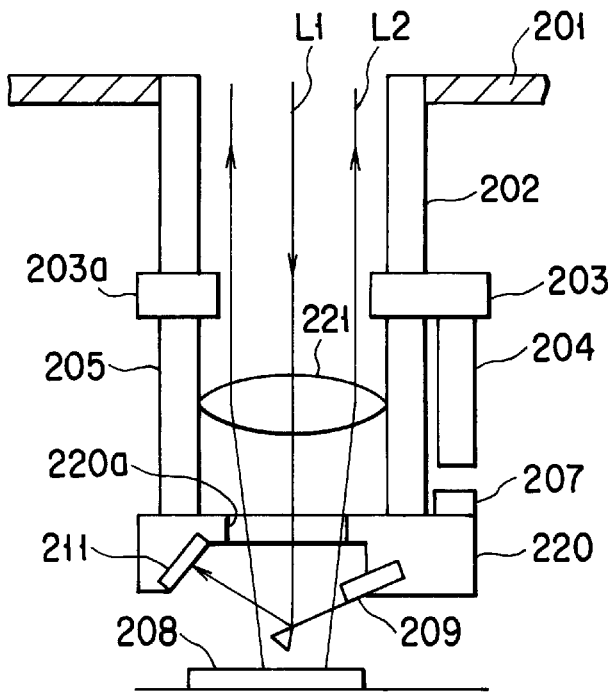
FIG. 7 shows a scanner system according to a sixth embodiment of the invention.

Referring now to FIG. 7, there will be described a scanner system according to a sixth embodiment of the invention. FIG. 7 shows the scanner system according to the present embodiment.

As shown in FIG. 7, an XY-displacement generator 202 displaceable in the X- and Y-directions is supported on a base 201 of a microscope body or the like. A connecting member 203 is fixed to a free end of the generator 202, and a Z-displacement generator 205 is fixed to the underside of the member 203.

The XY-displacement generator 202 comprises a cylindrical piezoelectric scanner, such as the one described in connection with the fourth embodiment shown in FIG. 5A, for example. Likewise, the Z-displacement generator 205 comprises a cylindrical piezoelectric actuator, such as the one described in connection with the fourth embodiment shown in FIG. 5B, for example.

The Z-displacement generator 205 comprises a structure equivalent to the already explained Z-axis piezoelectric drive section 107 in the second and third embodiments. Consequently, as voltages +V and −V are applied to the inside and outside electrodes 202b and 202c, respectively, the conventional Z-direction displacement is obtained with use of a scanner length shorter than that of the conventional one. Thus, the scanner system according to the present embodiment enjoys high resonance frequency, and therefore high responsivity, without failing to achieve the same Z-direction displacement as in the conventional case.

A cantilever fixing member 220 is fixed to the lower end of the Z-displacement generator 205, and a cantilever 209 is attached to the underside of the member 220. Further, the member 220 is provided with a light receiving section 211, a component of a cantilever sensor for detecting the displacement of the cantilever 209.

Outside the Z-displacement generator 205, a Z-displacement detector 204 is provided on the underside of the connecting member 203, and a target 207 for the detector 204 is located on the top surface of the cantilever fixing member 220. For example, the detector 204 may comprise a capacitance sensor for detecting capacitance between itself and the target 207, which varies depending on the distance between the two, and an optical interferometer as an example of an optical displacement detecting system.

In the present embodiment, just as in the foregoing embodiments, the XY-scanning neither causes the inclination of the target 207 to the detector 204 to change nor causes a point of measurement on the target 207 for measurement by means of the detector 204 to move. Accordingly, the Z-direction displacement of the target 207 with respect to the detector 204 is measured accurately. Thus, more accurate surface height information is obtained for a specimen 208, so that the surface shape of the specimen 208 is measured with higher accuracy.

The XY-displacement generator 202 is attached to an aperture formed in a base or microscope body 201, whereby the internal space of the generator 202 connects with that of the microscope body 201. The connecting member 203 has an aperture 203a inside the generators 202 and 205, while the cantilever fixing member 220 has an aperture 220a inside the generator 205. Further, an objective lens 221 for optically observing the specimen 208 and the cantilever 209 is provided inside the Z-displacement generator 205. The objective lens 221 is fixed by a fixing member (not shown) inside the Z-displacement generator 205. The objective lens 221 may be fixed to any member, for example, the connecting member 203, on condition that the specimen 208 and cantilever 209 can be observed.

A light beam L2 for optical observation from the specimen 208 is applied to a focusing optical system in the microscope body through the aperture 220a of the cantilever fixing member 220, objective lens 221, and aperture 203a of the connecting member 203, and is utilized for optical observation of the specimen 208 and the cantilever 209.

A light source section (not shown in FIG. 7) of the cantilever sensor is located in the microscope body 201, and a light beam L1 for displacement detection is applied from inside the body 201 to a region near the free end portion of the cantilever 209 through the aperture 203a of the connecting member 203, objective lens 221, and aperture 220a of the cantilever fixing member 220. The light reflected by the cantilever 209 is projected on the light receiving section 211, whereupon the section 211 delivers an output signal corresponding to the displacement of the cantilever 209. This output signal is utilized for the Z-direction feedback control described in connection with the foregoing embodiments.

The scanner system according to the present embodiment serves for simultaneous optical observation of the specimen and a probe, utilizing the respective internal spaces of the XY-displacement generator or cylindrical piezoelectric scanner 202 and the Z-displacement generator or cylindrical piezoelectric actuator 205. Thus, the probe on the free end of the cantilever 209 and the specimen are relatively positioned with high accuracy.

Since only the light receiving section 211 of the cantilever sensor is attached to the cantilever fixing member 220, moreover, the fixing member 220 has an advantage over that of the fifth embodiment in being lighter in weight.

It is to be understood that the present invention is not limited to the embodiments described above, and that various changes and modifications may be effected therein by one skilled in the art without departing from the scope or spirit of the invention.

According to the foregoing embodiments, for example, the holding section (e.g., specimen stage 206 or cantilever fixing member 220) for the object of scanning (e.g., specimen 208 or cantilever 209) is fixed to the Z-displacement generator 205, which is attached to the base 201 by means of the XY-displacement generator 202. In contrast with this, however, the holding member for the object of scanning may alternatively be fixed to the XY-displacement generator 202, which, in this case, is attached to the base 201 by means of the connecting member 203 and the Z-displacement generator 205.

Seventh Embodiment of the Invention

Figure 8:
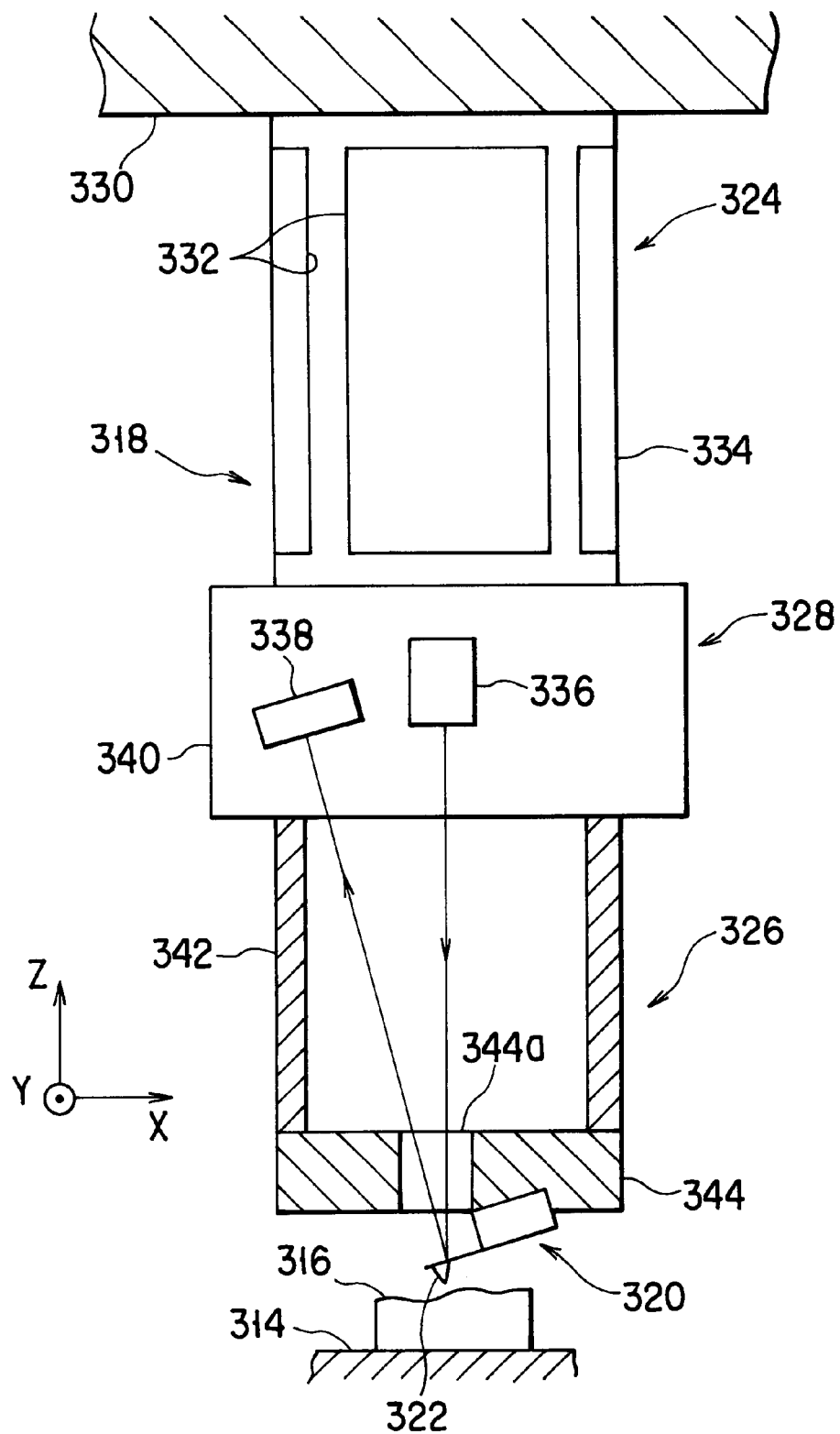
FIG. 8 is a view showing an arrangement of a scanning probe microscope according to a seventh embodiment of the invention.

Referring now to FIG. 8, there will be described a scanning probe microscope with a scanner system according to a seventh embodiment of the invention.

Static- and dynamic-mode methods are known as measuring methods that are applicable to the scanning probe microscope according to the present embodiment. In the static-mode measuring method, surface information for a specimen is measured by keeping constant the state of deflection of the cantilever with the probe contact pressure set as required as the probe is moved for scanning along the specimen without exciting the cantilever. In the dynamic-mode measuring method, surface information for a specimen is measured by keeping constant the distance between the center of vibration and the specimen surface as the probe is moved for scanning along the specimen with the cantilever excited at a predetermined resonance frequency. In the description to follow, these two measuring methods will be referred to generally and simply as SPM measurement.

According to the present embodiment, as shown in FIG. 8, there is provided a probe microscope 318 of a probe-scanning type, in which a probe 322 on the free end of a cantilever 320 is moved (for scanning) in a predetermined direction with respect to a specimen 316 placed on a fixed specimen stage 314, whereby surface information for the specimen 316 is subjected to SPM measurement based on interaction between the probe 322 and the specimen 316.

The scanning probe microscope 318 comprises an XY-scanning mechanism 324, a Z-movement mechanism 326, and a displacement detecting mechanism 328. The XY-scanning mechanism 324 moves the probe 322 on the cantilever 320 for scanning in the X- and Y-directions (horizontal directions) along the surface of the specimen 316. The Z-movement mechanism 326 moves the probe 322 on the cantilever 320 in the Z-direction (vertical direction) with respect to the specimen 316. The displacement detecting mechanism 328, which is located between the mechanisms 324 and 326, detects the displacement of the cantilever 320.

The "movement" used in the term "Z-movement mechanism 326" is supposed to include the movement of the cantilever 320 by means of the mechanism 326 in the feedback control for keeping constant a factor which may vary depending on the surface shape of the specimen 316, such as the state of deflection of the cantilever 320 in the static-mode and the distance between the vibration center and the specimen surface in the dynamic-mode.

The XY-scanning mechanism 324 comprises a cylindrical quadruple piezoelectric scanner 334, which is fixed to a fixed base 330 at its proximal end and includes four electrodes 332, for example. The scanner 334 displaces its movable end in the X- and Y-directions when it is supplied with a predetermined voltage.

The displacement detecting mechanism 328 is fixed to the movable end of the quadruple piezoelectric scanner 334. The mechanism 328 includes a light source, e.g., semiconductor laser 336 and a light receiving element 338. The light source 336 applies light for displacement measurement to the back surface (opposite from the surface on which the probe 322 is located) of the cantilever 320. The element 338 receives reflected light from the back surface of the cantilever 320 and outputs an electrical signal corresponding to the quantity of the received light. The displacement sensor elements, including the light source 336, light receiving element 338, etc., are stored and held together in a unit body 340, which is fixed to the movable end of the piezoelectric scanner 334.

The Z-movement mechanism 326 comprises a tube-type piezoelectric scanner 342, which is fixed to the unit body 340 at its proximal end and includes an undivided electrode, for example. The scanner 342 displaces its movable end in the Z-direction when it is supplied with a predetermined voltage.

The tube-type piezoelectric scanner 342, whose electrodes (not shown) are not divided, comprises a structure equivalent to the Z-axis piezoelectric drive section 107 already explained in the second and third embodiments of the present invention. Therefore, the present embodiment achieves advantages equivalent to those in the second and third embodiments, by applying voltages −V and +V to the inside and outside electrodes (not shown), respectively.

The cantilever 320 is supported on a holding member 344, which is fixed to the which is fixed to the movable end of the tube-type piezoelectric scanner 342. The holding member 344 has an aperture 344a through which the displacement measurement light from the light source 336 and the reflected light from the back surface of the cantilever 320 pass. The cantilever 320 is supported on the holding member 344 in a manner such that its free end portion (on the probe side) is situated on the optical path in the aperture 344a.

The following is a description of measuring operation.

First, the movable end of the tube-type piezoelectric scanner 342 is displaced in the Z-direction, for example, and the probe 322 on the cantilever 320 is brought closer to the surface of the specimen 316 by a predetermined distance.

Then, the movable end of the quadruple piezoelectric scanner 334 is displaced in the X- and Y-directions, for example, and the unit body 340 is moved in the X- and Y-directions within a given range. Thereupon, the displacement sensor elements, such as the light source 336, the light receiving element 338, and the like, held in the unit body 340, the tube-type piezoelectric scanner 342, and the cantilever 320 supported on the end of the scanner 342 by means of the holding member 344, integrally move together in the X- and Y-directions.

As this is done, the probe 322 on the cantilever 320 is moved for scanning in the X- and Y-directions along the surface of the specimen 316, the free end of the cantilever 320 is displaced by the interaction, e.g., atomic force or repulsive force or viscosity or magnetic force, between the apex of the probe 322 and the surface of the specimen 316, depending on the surface irregularity of the specimen surface, and the Z-direction angle of the cantilever angle changes.

If the displacement measurement light from the light source 336 is applied to the back surface of the cantilever 320 through the aperture 344a of the holding member 344 during the XY-scanning, the reflection angle of the reflected light from the back surface of the cantilever 320 changes depending on the displacement (angle variation) of the free end of the cantilever 320, so that the spot position on the light receiving element 338 changes.

As this is done, the light receiving element 338 outputs an electrical signal or displacement signal corresponding to the change of the spot position. At the same time, a feedback control circuit (not shown) applies a control voltage to the tube-type piezoelectric scanner 342 so that the displacement signal is constant (that is, the distance or interaction between the apex of the probe 322 and the surface of the specimen 316 is fixed), thereby displaying the movable end of the scanner 342 in the Z-direction. In this case, the Z-direction displacement of the end of the scanner 342 corresponds to the surface irregularity of the specimen 316 or change of the interaction. Therefore, the surface irregularity information for the specimen 316 or specimen information based on the interaction is measured by detecting the Z-direction displacement of the scanner end in accordance with the control voltage delivered from the feedback control circuit during the XY-scanning.

According to the present embodiment, the cantilever 320 and the displacement sensor elements, such as the light source 336 and the light receiving element 338, integrally move together in the X- and Y-directions. If the relative positions of the cantilever 320 and the displacement sensor elements are set so that the displacement measurement light from the light source 336 and the reflected light from the back surface of the cantilever 320 are applied to the back surface of the cantilever and the light receiving element 338, respectively, therefore, the displacement measurement light from the light source 336 never misses the back surface of the cantilever 320 during the measurement that involves the aforesaid XY-scanning.

The light source 336 comprises, for example, a semiconductor laser, a laser emitting direction adjusting mechanism, several lenses, some mechanical parts (not shown), etc. The light receiving element 338 comprises a quadruple photodiode, a two-dimensional adjusting mechanism including mechanical parts, etc.

Figure 14:
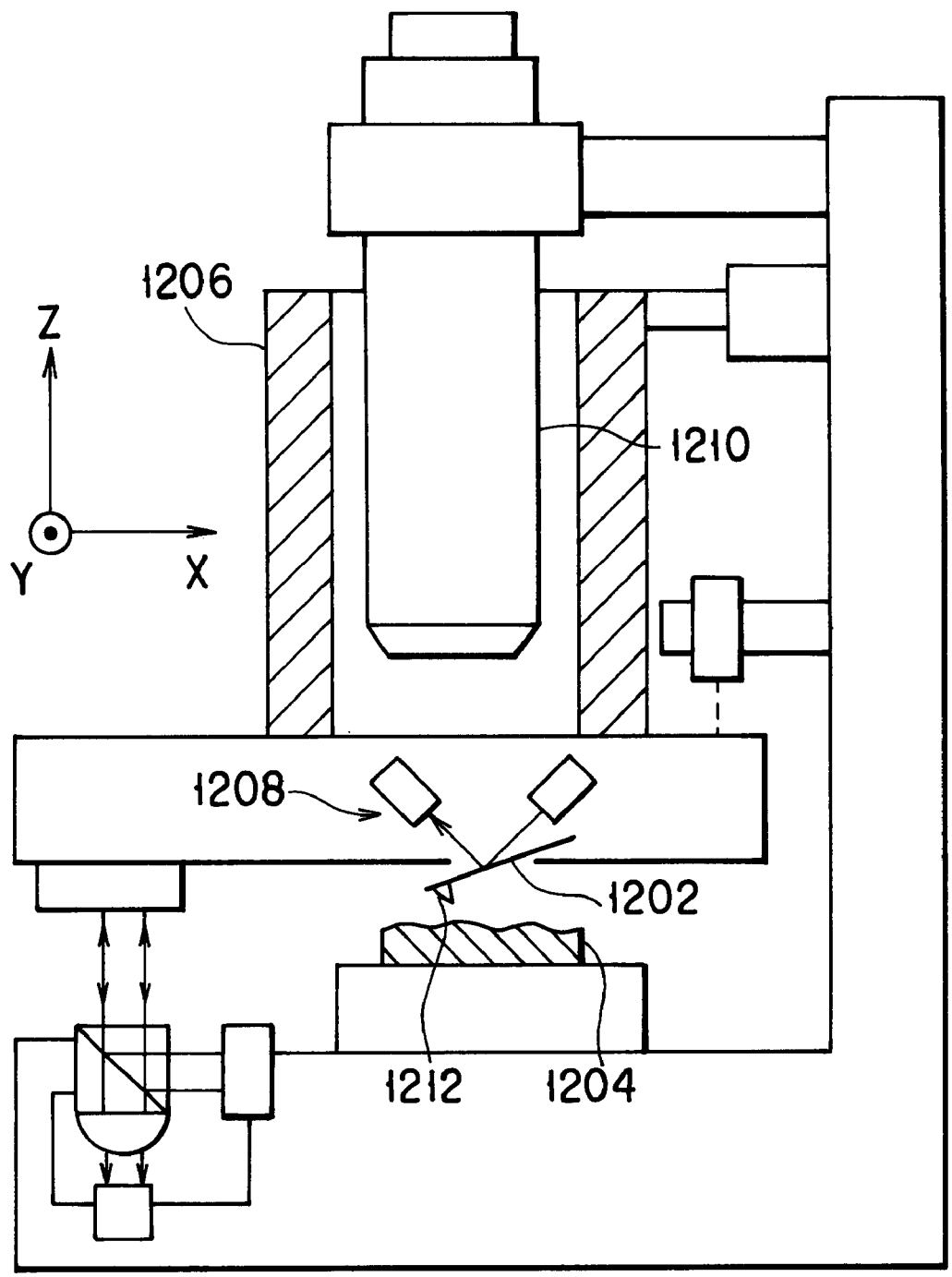
FIG. 14 is a view showing an arrangement of a conventional scanning probe microscope.

In this case, the total mass of the displacement sensor elements, such as the light source 336, the light receiving element 338, and the like, reaches about 40 g. If these heavyweight structures are mounted on the end of the scanner, as in the system shown in FIG. 14, the resonance frequency of the scanner cannot be adjusted to a high level.

According to the present embodiment, therefore, the unit body 340 storing the displacement sensor elements, such as the light source 336, the light receiving element 338, and the like, is located between the quadruple piezoelectric scanner 334 and the tube-type piezoelectric scanner 342 so that the sensor elements, heavyweight structures, are situated close to the fixed base 330, and the cantilever 320 is located on the movable end of the tube-type scanner 342. The mass of the cantilever 320 is adjusted to about 10 mg, and that of the holding member 344 to about 1 g or less. If the cantilever 320 and the holding member 344 are attached to the end of the scanner 342, therefore, the resonance frequency of the scanner 342 cannot be lowered.

Thus, the probe-scanning microscope 318 according to the present embodiment enjoys a higher resonance than the prior art example.

Let it be supposed that the unit body 340 of the probe microscope 318, storing the displacement sensor elements therein, is situated at a distance equal to about 70% of the fixed overall length of the microscope 318 from the fixed base 330, the overall length ranging from the base 330 to the cantilever 320. Thereupon, the resonance frequency can be increased to about 1.7 times as high as that of the prior art example, according to an oscillometric formula. Since the scanning speed is upped by increasing the resonance frequency in this manner, the measuring time is shortened.

More specifically, the measuring time can be made about 43% shorter than in the conventional case.

If the resonance frequency is increased to about 1.7 times, the elastic constant of the whole scanner, which comprises the quadruple piezoelectric scanner 334 and the tube-type piezoelectric scanner 342, is increased to about 3 times as high as that of the prior art example. In consequence, the displacement of the whole scanner for a given disturbance oscillation can be reduced to about ⅓ that of the prior art example, so that the scanner enjoys high rigidity against disturbance oscillation.

Thus, according to the present embodiment, there may be provided a scanning probe microscope with a scanner system that enjoys improved resonance frequency and high rigidity.

According to the embodiment described above, the unit body 340 storing the displacement sensor elements, such as the light source 336, the light receiving element 338, and the like, is fixed to the movable end of the quadruple piezoelectric scanner 334 which is fixed to the fixed base 330, and the tube-type piezoelectric scanner 342 supporting the cantilever 320 is located under the unit body 340. Alternatively, however, the tube-type piezoelectric scanner 342 may be fixed to the fixed base 330. In this case, the cantilever 320 is supported on the end of the quadruple piezoelectric scanner 334. Thus, the unit body 340 storing the displacement sensor elements, such as the light source 336, light receiving element 338, and the like, may be fixed to the end of the tube-type piezoelectric scanner 342 which is fixed to the fixed base 330. In this case, the quadruple piezoelectric scanner 334 supporting the cantilever 320 is located under the unit body 340.

In this case, a relative movement is produced between the cantilever 320 and the displacement measurement light radiated onto the cantilever 320. The relative movement, however, is small in comparison with the conventional scanner system, because the displacement sensor is close to the cantilever 320 by an extent corresponding to the length of the tube-type piezoelectric scanner 342. Due to the small relative movement, the displacement measurement light is prevented from easily shifting off the back surface of the cantilever 320, and the inconvenience entailed in the prior art can therefore be suppressed.

Eighth Embodiment of the Invention

Figure 9:
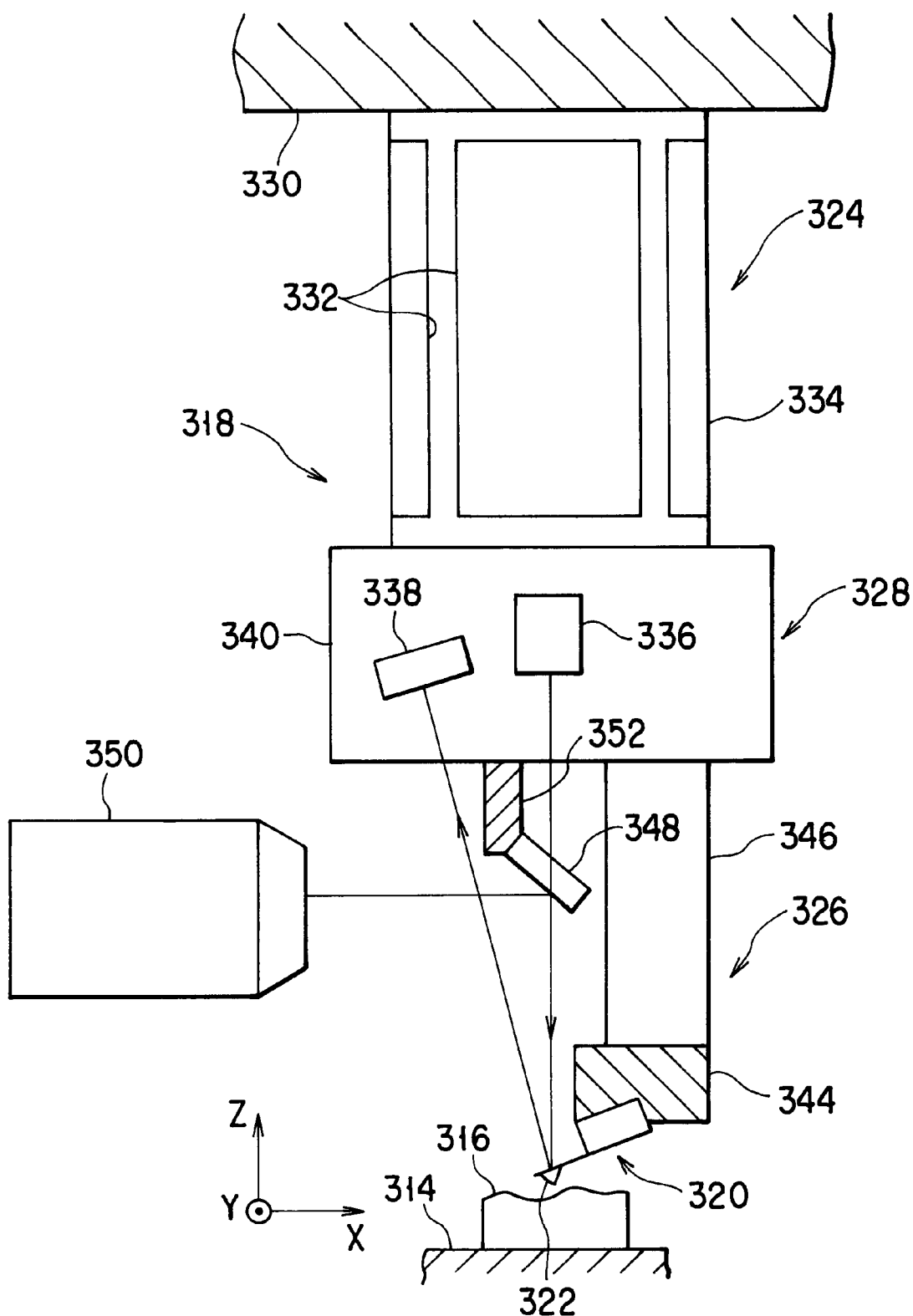
FIG. 9 is a view showing an arrangement of a scanning probe microscope according to an eighth embodiment of the invention.

Referring now to FIG. 9, there will be described a scanning probe microscope with a scanner system according to an eighth embodiment of the invention. In the description of the present embodiment to follow, the same components used in the seventh embodiment are designated by like reference numeral, and a description of those components is omitted.

As shown in FIG. 9, the present embodiment is an improvement of the probe microscope 318 of the probe-scanning type. The Z-movement mechanism 326 comprises a laminated piezoelectric element 346, which is fixed to a unit body 340 at its proximal end and supports a cantilever 320 on its movable end by means of a holding member 344.

The laminated piezoelectric element 346 displaces its movable end in the Z-direction when it is supplied with a predetermined voltage.

A half-mirror 348 is interposed between the cantilever 320 and a light source 336, and an optical microscope 350 for the observation of the cantilever 320 and a specimen 316 via the half-mirror 348 is located near the half-mirror 348. The half-mirror 348 is fixed to the unit body 340 by means of a support member 352.

For other components, the eighth embodiment is arranged in the same manner as the seventh embodiment, so that a description of those components is omitted.

The scanning probe microscope according to the present invention operates in the same manner as the one according to the seventh embodiment. Since the laminated piezoelectric element 346 is used as the Z-movement mechanism 326, however, a space is formed above the cantilever 320, so that the degree of freedom of the system configuration is improved. According to the present embodiment, therefore, the half-mirror 348 and the optical microscope 350 are located in the space above the cantilever 320, whereby an observation optical path is formed extending from the microscope 350 to the cantilever 320 and the specimen 316 via the half-mirror 348. Before, during, and after cantilever scanning in the X-, Y-, and X-directions, therefore, the cantilever 320 and the specimen 316 and their relative positions can be observed by means of the microscope 350. Further, the optical microscope 350 is provided with a monitor (not shown) for displaying the cantilever 320 and the specimen 316, whereby the position of a laser beam applied to the cantilever 320 can be adjusted on the monitor.

Since other functions and effects of the present embodiment are the same as those of the seventh embodiment, a description of those particulars is omitted.

Figure 10A:
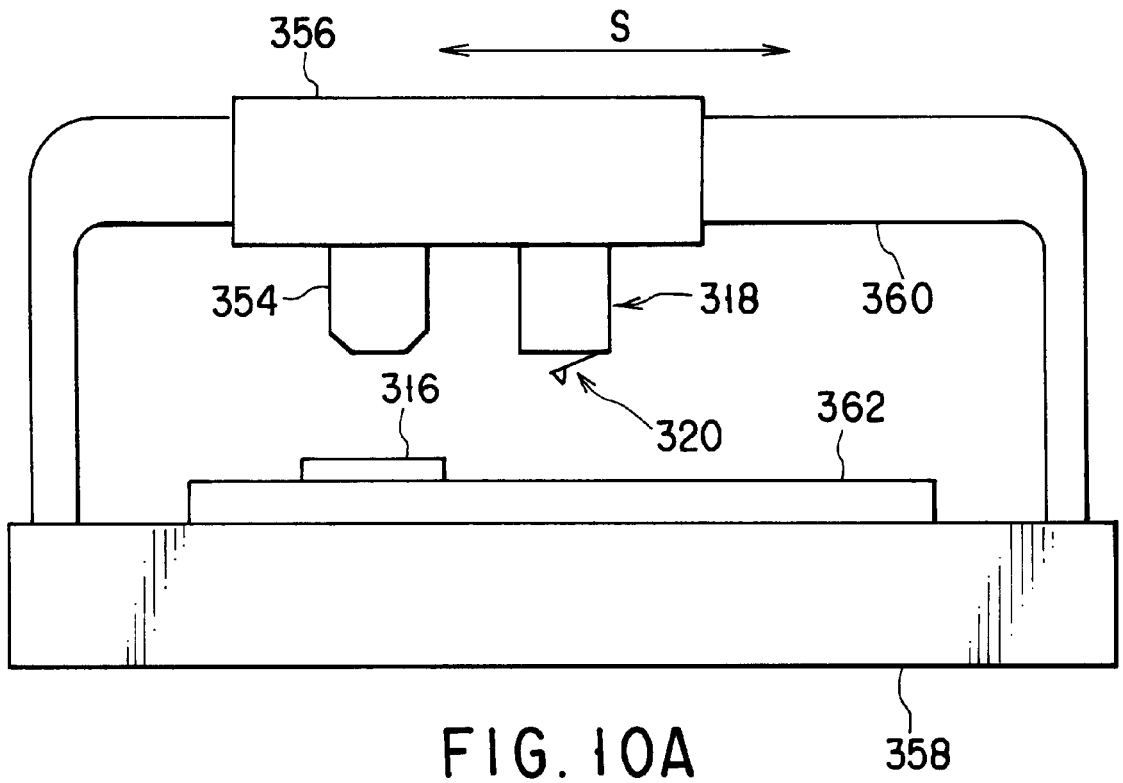
FIGS. 10A and 10B are views showing the scanning probe microscopes according to the seventh and eighth embodiments incorporated in a measuring device, respectively.
Figure 10B:
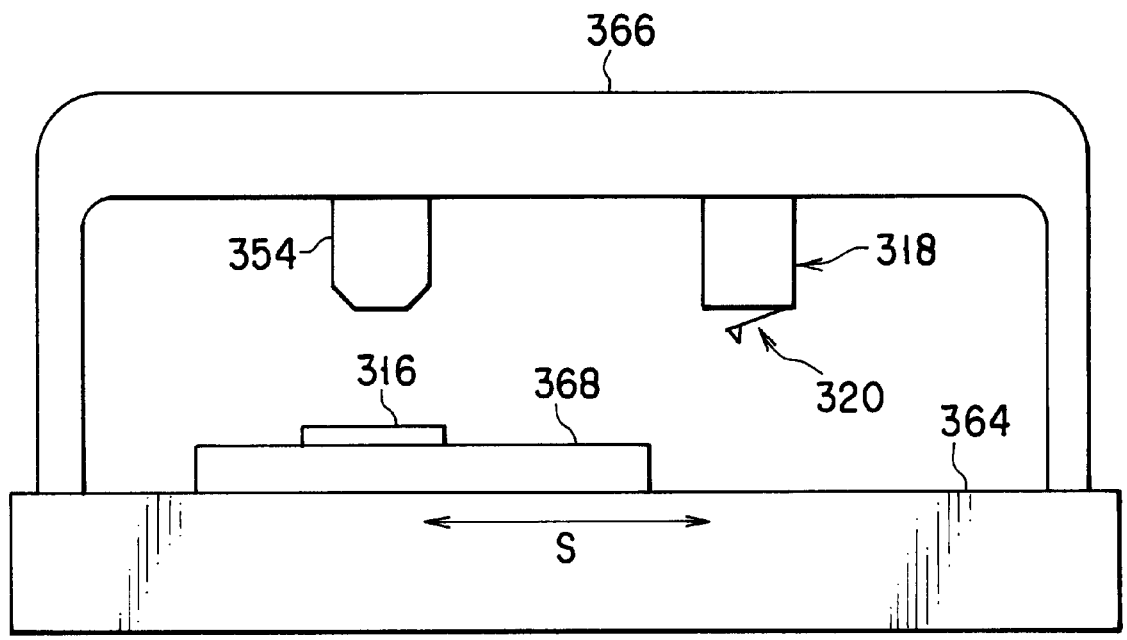

Either of the probe-scanning microscopes 318 using a scanner system according to the fifth through eighth embodiments may be incorporated into a measuring device, such as the ones shown in FIGS. 10A and 10B.

In the measuring device shown in FIG. 10A, for example, the probe-scanning microscope 318, along with an observation optical system 354, is fixed to a slider 356, which is slidable in the direction of arrow S along a guide arm 360 which is set up on a fixed base 358. Fixed to the base 364 is a specimen stage 368 on which the specimen 316 is mounted.

After the specimen 316 is observed by means of the observation optical system 354, for example, according to this measuring device, the slider 356 is slid to situate the probe-scanning microscope 318 over the specimen 316, whereby an observed portion of the specimen 316 observed by means of the optical system 354 can be subjected to SPM measurement.

In the measuring device shown in FIG. 10B, moreover, the probe-scanning microscope 318, along with an observation optical system 354, is fixed to an arm 366 which is set up on a fixed base 364. The base 364 is provided with a specimen stage 364 which is movable in the direction of arrow S with the specimen 316 thereon.

After the specimen 316 is observed by means of the observation optical system 354, for example, according to this measuring device, the specimen stage 368 is slid to situate the specimen 316 in a measuring region of the probe-scanning microscope 318, whereby an observed portion of the specimen 316 observed by means of the optical system 354 can be subjected to SPM measurement.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A piezoelectric micro-inching mechanism for use in a scanning probe microscope, said mechanism comprising:

a first piezoelectric drive section displaceable along a first axis and a second axis; and a second piezoelectric drive section displaceable along a third axis perpendicular to the first and second axes, wherein the first piezoelectric drive section includes a first cylindrical piezoelectric element, a first common electrode provided inside the first piezoelectric element, and four driving electrodes arranged at intervals in a circumferential direction outside the first piezoelectric element, wherein the second piezoelectric drive section includes a second cylindrical piezoelectric element, an inside electrode provided inside of the second piezoelectric element, and an outside electrode provided outside of the second piezoelectric element, and wherein said first and second piezoelectric drive sections are separate structures which are connected together through an elastic member.

2. A piezoelectric micro-inching mechanism according to claim 1, wherein said first and second piezoelectric drive sections are connected by a connecting member as well as through the elastic member.

3. A piezoelectric micro-inching mechanism according to claim 1, wherein opposite-polarity voltages are applied individually to the inside and outside electrodes of said second piezoelectric drive section.

4. A scanner system used in a scanning probe microscope and capable of scanning an object of scanning in X-, Y-, and Z-directions crossing one another, the scanner system comprising:

a holding section for holding the object of scanning;

a Z-displacement generator for applying a Z-direction displacement to the holding section;

an XY-displacement generator for applying X- and Y-direction displacements to the holding section;

a connecting member for connecting the Z-displacement generator and the XY-displacement generator; and a Z-displacement detector for detecting the Z-direction displacement of the holding section, the holding section and the Z-displacement detector being supported by the Z-displacement generator and the connecting member, respectively.

5. A scanner system according to claim 4, wherein said XY-displacement generator comprises a cylindrical piezoelectric scanner including a cylindrical piezoelectric element, a common electrode internally surrounding the inner peripheral surface of the piezoelectric element, and four driving electrodes arranged at intervals in the circumferential direction of the outer peripheral surface of the piezoelectric element.

6. A scanner system according to claim 5, wherein said Z-displacement generator comprises a cylindrical piezoelectric actuator including a cylindrical piezoelectric element, an inside electrode internally surrounding the inner peripheral surface of the piezoelectric element, and an outside electrode surrounding the outer peripheral surface of the piezoelectric element.

7. A scanner system according to claim 6, wherein said Z-displacement detector is situated inside the cylindrical piezoelectric actuator.

8. A scanner system according to claim 7, wherein said object of scanning is a specimen, and said holding member is a specimen stage on which the specimen is mounted.

9. A scanner system according to claim 7, wherein said object of scanning is a cantilever, and said holding section is a cantilever fixing member fitted with the cantilever.

10. A scanner system according to claim 9, wherein said cantilever fixing member is provided with a cantilever sensor for detecting the displacement of the cantilever.

11. A scanner system according to claim 6, wherein said Z-displacement detector is situated outside the cylindrical piezoelectric actuator.

12. A scanner system according to claim 11, wherein said object of scanning is a cantilever, and said holding section is a cantilever fixing member fitted with the cantilever.

13. A scanner system according to claim 6, wherein opposite-polarity voltages are applied individually to the inside and outside electrodes.

14. A scanner system used in a scanning probe microscope, comprising:

a scanning mechanism for scanning a probe on a cantilever in horizontal directions along the surface of a specimen;

a moving mechanism for moving the probe on the cantilever in a vertical direction with respect to the specimen; and a displacement detecting mechanism situated between the scanning mechanism and the moving mechanism and capable of detecting the displacement of the cantilever.

15. A scanner system according to claim 14, wherein said displacement detecting mechanism is provided with a displacement sensor including a light source for applying displacement measurement light to the cantilever and a light receiving element for receiving reflected light from the cantilever and for output of an electrical signal corresponding to the quantity of the received light, the displacement sensor being stored in a unit body located between the scanning mechanism and the moving mechanism.

16. A scanner system according to claim 14, further comprising a cantilever holding section, mounted on the moving mechanism, for holding the cantilever.

17. A scanner system according to claim 14, wherein the moving mechanism comprised a cylindrical piezoelectric element, an inside electrode internally surrounding the inside of the piezoelectric element, and an outside electrode surrounding the outside of the piezoelectric element.

18. A scanner system according to claim 17, wherein opposite-polarity voltages are applied individually to the inside and outside electrodes.

* * * * *